(12) United States Patent
Weinstein et al.

(10) Patent No.: US 8,935,793 B2
(45) Date of Patent: Jan. 13, 2015

(54) HYGIENIC CHARGING STATION FOR MOBILE DEVICE SECURITY

(75) Inventors: David Weinstein, Laurel, MD (US); David Keppler, Herndon, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 13/434,146

(22) Filed: Mar. 29, 2012

(65) Prior Publication Data

US 2013/0227694 A1 Aug. 29, 2013

Related U.S. Application Data

(60) Provisional application No. 61/604,848, filed on Feb. 29, 2012.

(51) Int. Cl.
*G06F 21/00* (2013.01)
*G06F 21/57* (2013.01)

(52) U.S. Cl.
CPC .................................... *G06F 21/577* (2013.01)
USPC ........................................................... 726/25

(58) Field of Classification Search
CPC .................................................... G06F 21/577
USPC ................... 726/25, 34, 35, 36, 22, 23, 24
See application file for complete search history.

(56) References Cited

U.S. PATENT DOCUMENTS

| 7,002,265 | B2* | 2/2006 | Potega | 307/149 |
|---|---|---|---|---|
| 7,814,490 | B2* | 10/2010 | Capek et al. | 718/103 |
| 8,370,840 | B2* | 2/2013 | Capek et al. | 718/102 |
| 8,407,793 | B2* | 3/2013 | Demblewski | 726/24 |
| 8,584,243 | B2* | 11/2013 | Britton et al. | 726/24 |
| 8,595,841 | B2* | 11/2013 | Britton et al. | 726/24 |
| 2001/0055978 | A1* | 12/2001 | Herrod et al. | 455/517 |
| 2002/0085511 | A1* | 7/2002 | Koponen et al. | 370/315 |
| 2003/0085621 | A1* | 5/2003 | Potega | 307/18 |
| 2005/0127867 | A1* | 6/2005 | Calhoon et al. | 320/108 |
| 2005/0127868 | A1* | 6/2005 | Calhoon et al. | 320/108 |
| 2005/0245245 | A1* | 11/2005 | Sorvari et al. | 455/418 |
| 2009/0158423 | A1* | 6/2009 | Orlassino et al. | 726/19 |
| 2010/0011442 | A1* | 1/2010 | Zhao | 726/24 |
| 2010/0011443 | A1* | 1/2010 | Zhao | 726/24 |
| 2010/0031047 | A1* | 2/2010 | Coker et al. | 713/176 |
| 2010/0037321 | A1* | 2/2010 | Oz et al. | 726/24 |
| 2010/0154060 | A1* | 6/2010 | Demblewski | 726/24 |
| 2010/0223471 | A1* | 9/2010 | Fresko et al. | 713/176 |
| 2010/0250955 | A1* | 9/2010 | Trevithick et al. | 713/185 |
| 2010/0313270 | A1* | 12/2010 | Kim et al. | 726/24 |
| 2010/0325441 | A1* | 12/2010 | Laurie et al. | 713/185 |
| 2011/0026710 | A1* | 2/2011 | Lotspiech | 380/255 |

(Continued)

OTHER PUBLICATIONS

Jakobsson et al. (Feb. 2010). "Assured Detection of Malware with Applications to Mobile Platforms," *DIMACS Technical Report Mar. 2010*: 1-21.

(Continued)

*Primary Examiner* — David Garcia Cervetti
(74) *Attorney, Agent, or Firm* — Morrison & Foerster LLP

(57) ABSTRACT

A mobile device charging station configured to analyze, measure and respond to/correct the state of a mobile device. The charging station can employ an embedded cryptographic subsystem that can make use of anti-tamper/tamper evident techniques to protect stored firmware images/cryptographic material.

29 Claims, 5 Drawing Sheets

(56) References Cited

U.S. PATENT DOCUMENTS

| | | | |
|---|---|---|---|
| 2011/0035624 A1* | 2/2011 | Miller | 714/15 |
| 2011/0072274 A1* | 3/2011 | Leoutsarakos et al. | 713/182 |
| 2011/0087870 A1* | 4/2011 | Spangler et al. | 713/2 |
| 2011/0088093 A1* | 4/2011 | Kang et al. | 726/22 |
| 2011/0093840 A1* | 4/2011 | Pynenburg et al. | 717/168 |
| 2011/0238542 A1* | 9/2011 | Gentry et al. | 705/30 |
| 2011/0302420 A1* | 12/2011 | Davida | 713/180 |
| 2012/0005747 A1* | 1/2012 | Tribble | 726/18 |
| 2012/0008784 A1* | 1/2012 | Hallam-Baker | 380/278 |
| 2012/0023568 A1* | 1/2012 | Cha et al. | 726/10 |
| 2012/0060036 A1* | 3/2012 | Hamid et al. | 713/176 |
| 2012/0072979 A1* | 3/2012 | Cha et al. | 726/7 |
| 2012/0079559 A1* | 3/2012 | Reznik et al. | 726/1 |
| 2012/0110337 A1* | 5/2012 | Murphey et al. | 713/182 |
| 2012/0123947 A1* | 5/2012 | Jones | 705/65 |
| 2012/0151223 A1* | 6/2012 | Conde Marques et al. | 713/193 |
| 2012/0167194 A1* | 6/2012 | Reese et al. | 726/9 |
| 2012/0180126 A1* | 7/2012 | Liu et al. | 726/22 |
| 2013/0014263 A1* | 1/2013 | Porcello et al. | 726/25 |
| 2013/0034230 A1* | 2/2013 | Takahashi | 380/270 |
| 2013/0091216 A1* | 4/2013 | Rajakarunanayake et al. | 709/204 |
| 2013/0091551 A1* | 4/2013 | Rajakarunanayake et al. | 726/4 |
| 2013/0117850 A1* | 5/2013 | Britton et al. | 726/23 |
| 2013/0117854 A1* | 5/2013 | Britton et al. | 726/24 |
| 2013/0239216 A1* | 9/2013 | Britton et al. | 726/24 |
| 2014/0082732 A1* | 3/2014 | Britton et al. | 726/24 |

OTHER PUBLICATIONS

Jiang, X. "Gingermaster: First Android Malware Utilizing a Root Exploit on Android 2.3 (Gingerbread)," located at <http://www.csc.ncsu.edu/faculty/jiang/GingerMaster/> visited on May 15, 2012. (3 pages).

Jiang, X. "Security Alert: New RootSmart Android Malware Utilizes the GingerBreak Root Exploit," located at <http://www.csc.ncsu.edu/faculty/jiang/RootSmart/> visited on May 15, 2012. (2 pages).

Schwartz, M.J. "Apple Patents Power Charger Password Recovery," located at <http://www.informationweek.com/news/security/mobile/232400075> visited on May 15, 2012. (2 pages).

Seshadri, A. (2009). "A Software Primitive for Externally-verifiable Untampered Execution and its Applications to Securing Computing Systems," *Carnegie Mellon University, Pittsburgh, PA*: 1-160.

Svajcer, V. "First Malware Using Android Gingerbreak Root Exploit," located at <http://nakedsecurity.sophos.com/2011/08/22/first-malware-using-android-gingerbreak-exploit/> visited on May 15, 2012. (3 pages).

Venugopal, D. (2006). "An Efficient Signature Representation and Matching Method for Mobile Devices" *In* WICON '06, The 2nd Annual International Wireless Internet Conference, Aug. 2-5, 2006, Boston, MA: 1-9.

\* cited by examiner

HYGIENIC CHARGING STATION FOR MOBILE DEVICE SECURITY

CROSS REFERENCE TO RELATED APPLICATIONS

This application claims the benefit of U.S. Provisional Patent Application No. 61/604,848, filed Feb. 29, 2012, the entirety of which is incorporated herein by reference.

FIELD OF THE DISCLOSURE

This relates to mobile device security, and more particularly, to providing mobile device security through the use of a charging station.

BACKGROUND

Measuring and attesting to the operational integrity and security posture of a mobile device is challenging. For example, smart phones and tablet computers currently lack a number of traditional security features that have emerged for commodity laptops and desktops. In addition to restricted power, mobile devices generally don't have a Trusted Platform Module (TPM) and currently lack ubiquitous virtualization capability, which limits some current approaches to security. Even as these security mechanisms reemerge for mobile devices, no single one is expected to be a "silver bullet."

Black-listing and, in general, malicious signature detection has proven to be ineffective against polymorphic malware and other attacker techniques. Virus scanning, virtual machine introspection and taint tracing can also deplete a device's battery faster than normal. [Deepak Venugopal, An efficient signature representation and matching method for mobile devices, In Proceedings of the 2nd annual international workshop on Wireless internet, WICON'06, New York, N.Y., USA, 2006, ACM.] Battery drain is a critical aspect of a consumer's experience with mobile devices—a security mechanism that tips the balance of this reality will undoubtedly be met with disdain by consumers and unlikely to be adopted by vendors.

SUMMARY

By taking advantage of the need to recharge mobile devices, a hygienic smart charger can be provided to measure, attest, and remediate the integrity of hosted mobile devices via a peripheral interface such as the Universal Serial Bus (USB) while the mobile device recharges. This can provide an alternative defensive security strategy for devices with inherently limited power.

In one embodiment the charger can take the form of a plug computer with embedded adaptable logic to analyze a security state of a mobile device. Such analysis can include gathering evidence of the side effects caused by malicious activity whether on non-volatile storage or in-memory. These observations can be made at different layers of the operating system (OS) stack with the phone in different states.

For example, measurements can be obtained on-device while the main OS is running, externally on the charger via a peripheral interface and debugging mechanisms, and by placing the phone into a minimalistic recovery state—typically used for forensics—where a smaller execution context is used to check the device's integrity. Since malware has different persistence mechanisms, measurements from different vantage points can warrant different types of remediation such as a straightforward response of re-flashing the entire mobile device to a master image.

DETAILED DESCRIPTION

Figure 1:
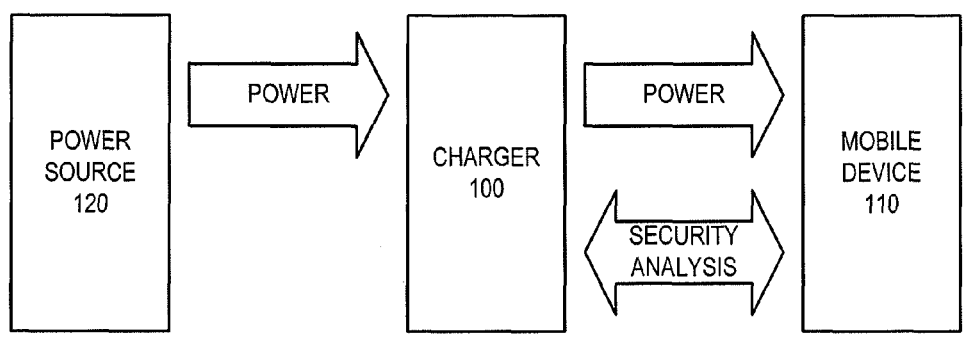
FIG. 1 illustrates an example of a hygienic charging operation in accordance with one embodiment.

Malware can easily be embedded into mobile devices. For example, an adversary could gain an initial presence on a user's device by crafting a malicious app and placing it on an online app store such as the ANDROID Market. The app could provide features bundled with a malicious payload. It is assumed that the app store owner makes a best effort to remove applications that are determined malicious, but such detection can be made increasingly difficult by an attacker, resulting in a time delay that could allow malware some period of efficacy. Alternatively, the user may be tricked into downloading a malicious application from a third-party market with a spear phishing attack.

For example, applications on ANDROID devices use an all-or-nothing permissions model. Many users don't understand the risks inherent in these permissions. For example, how could a user know that granting access to a phone's crash-log information could aid in escalating an application's privileges to root privileges, as in the case of GingerBreak? [Xuxian Jiang, Gingermaster: First ANDROID malware utilizing a root exploit on ANDROID 2.3 (gingerbread), August 2011.] [Xuxian Jiang, Security alert: New rootsmart ANDROID malware utilizes the gingerbreak root exploit, February 2012.] [Vanja Svajcer, First malware using ANDROID gingerbreak root exploit, August 2011.] Alternatively, a sophisticated attacker could target a user's other computing devices (e.g., personal laptop or desktop) and wait for the user to plug in the mobile device. Laptops and desktops suffer from large attack surfaces because they are general purpose computing devices often used to access rich media.

Integrity violations introduced by malicious software can be dependent on the device's existing security mechanisms. Examples of integrity violations include 1) changes to the bootloader, which is the first code to execute on a mobile device at boot time (e.g., a bootkit), 2) replacing the kernel entirely and/or modifying kernel data structures at runtime to hide malicious activity (e.g., a rootkit), 3) implanting native binaries that obfuscate application-layer malware analysis, 4) implanting of managed-code rootkits into virtual machine (VM) applications (e.g., the DALVIK VM) and associated data structures, 5) modifying permissions on key system files (e.g., SUID-bits), allowing other malware components a mechanism to hide in plain sight and 6) marking good storage blocks bad and using them for covert data storage.

Further, detecting and mitigating integrity violations can depend on a mobile device vendor's implementation of the mobile device. For example, replacing the bootloader on some devices can be infeasible because this critical software must be signed using a private key only the vendor has, and the bootloader is verified using a corresponding burned in public key that cannot be changed by conventional means. In order to be usable, some region of the devices storage must be read/write, and thus could be used for persistence by malware.

The proliferation of malicious software on mobile devices is only going to get worse. However, power constraints on mobile devices limit the capabilities/techniques that can be applied on low power devices such as smartphones and tablet computers. Since these devices are plugged in (e.g., to a wall plug or PC USB port) or "docked" (e.g., to a docking station) often—sometimes on a daily basis—to replenish the battery, this presents an opportune time, during which the device is largely idle, in which to determine the security posture of the device. While not all attack vectors may be averted, it can raise the bar for an attacker, in particular making persistence increasingly challenging.

Recharger devices have traditionally been simple devices, such as alternating current (AC) to direct current (DC) power adapters whose intelligence is used to control the power-rate at which a device is charged (i.e., in a way that is most efficient to the life of the battery). However, it is believed that a hygienic charger can help mitigate the risk of persistent malicious software on mobile devices and aid in raising the bar for a sophisticated attacker to be successful in the attacker's mission.

FIG. 1 illustrates an example of a hygienic charging operation in accordance with one embodiment. As shown in FIG. 1, charger 100 can be configured to recharge mobile device 110 by providing power from power source 120 and to communicate with mobile device 110 to analyze a security state of the mobile device, such as whether and/or to w hat degree the mobile device presents indications of compromise or is otherwise in a state that it should not be in. As part of this security analysis, charger 100 can be configured to perform a variety of security measures in addition to recharging the mobile device battery, such as performing platform integrity checking, providing secure (cryptographic) storage of sensitive information, storing a master image of the mobile device, aiding in repurposing the mobile device from a personal phone to a business platform for the duration of business/sensitive operations, periodically re-flashing a known-good "golden" image to eliminate persistence of malicious software (e.g., keyloggers, rootkits, trojans), provisioning a cryptographic token indicating the mobile device has been analyzed by charger 100, and using the cryptographic token to allow access to a protected network (e.g., VPN) or data.

Figure 2:
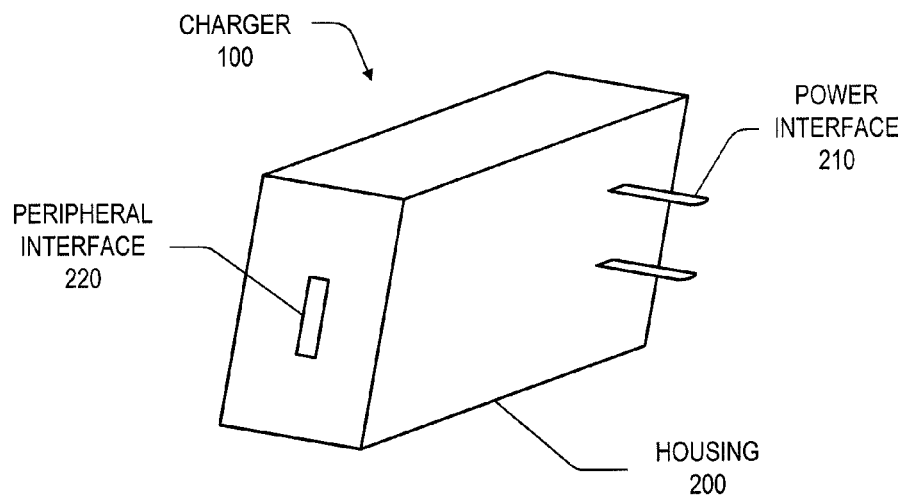
FIG. 2 illustrates an example of a charger apparatus in accordance with one embodiment.

FIG. 2 illustrates an example of a charger apparatus in accordance with one embodiment. As shown in FIG. 2, charger 100 can comprise housing 200 with power interface 210 and peripheral interface 220. Power interface 210 can comprise any suitable interface configured to connect to power source 120, such as prongs protruding from housing 200 (e.g., an integral male plug) configured to plug directly into power source 120 (as shown in FIG. 2), an integrated or connectable power cord or a wireless power interface. Peripheral interface 220 can comprise any suitable interface configured to connect to mobile device 110, such as a Universal Serial Bus (USB) port. Additional interfaces (not shown) can be provided on the housing, such as storage interfaces (e.g., a memory card slot), input interfaces (e.g., buttons) and output interfaces (e.g., lights).

Charger 110 can comprise an embedded system such as "plug" computer configured to plug directly into a power outlet. Plug computers have become less expensive, ubiquitous and sufficiently powerful, and thus provide a small form-factor system on chip (SoC) design that can be used to meet the requirements of a "smart" hygienic charger device in accordance with the teachings of the present disclosure.

In particular, charger 100 can implement in-built debugging/recovery mechanisms that become available upon mobile devices being plugged into charger 100 as a host system via peripheral interfaces (e.g., USB host interface). Charger 100 can be configured with a smaller attack surface than that of a typical laptop/desktop while also being outside the critical path of an attacker. In addition, charger 100 need not be directly network accessible (e.g., it can receive encrypted update modules via mobile device 110) or support the execution of rich media formats such as PDF, Flash, or be usable as a web browser. This reduced functionality and specialization can reduce the attack surface significantly and can be leveraged by an enterprise associated with the mobile device. In one embodiment charger 100 can be implemented using the SheevaPlug plug computer which is a Marvell Kirkwood (ARM-based) platform with USB host connectivity.

Figure 3:
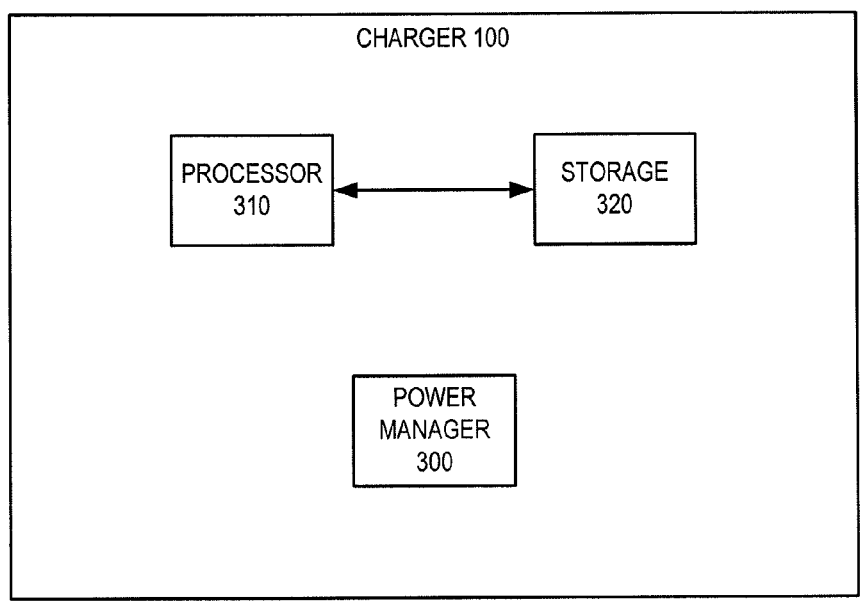
FIG. 3 illustrates an example of a system architecture of a charger in accordance with one embodiment.

FIG. 3 illustrates an example of a system architecture of a charger in accordance with one embodiment. In the illustrated embodiment charger 100 can comprise power manager 300, processor 310 and storage 320. Power manager 300 can comprise any suitable circuitry configured to provide power from power source 320 to mobile device 110, such as circuitry configured to draw AC power of power source 320 from a standard connector and adapt the AC to DC suitable for mobile device 110 (e.g., providing the 5V and up to 500 mA power supply to the mobile device for charging). Processor 310 can comprise any suitable circuitry, such as a cryptographic processor, capable of running an OS configured to analyze a security state of the mobile device in accordance with the teachings of the present disclosure, such as a minimalistic OS that is specifically configured to execute pre-set sanity checks on mobile device 110. Storage 320 can comprise any suitable storage, such as non-volatile storage (e.g., NAND, disk drive), configured to store data in accordance with the teachings of the present disclosure, such as a recovery or boot image for mobile device 110 and/or a public key of an enterprise server associated with mobile device 110.

Figure 4:
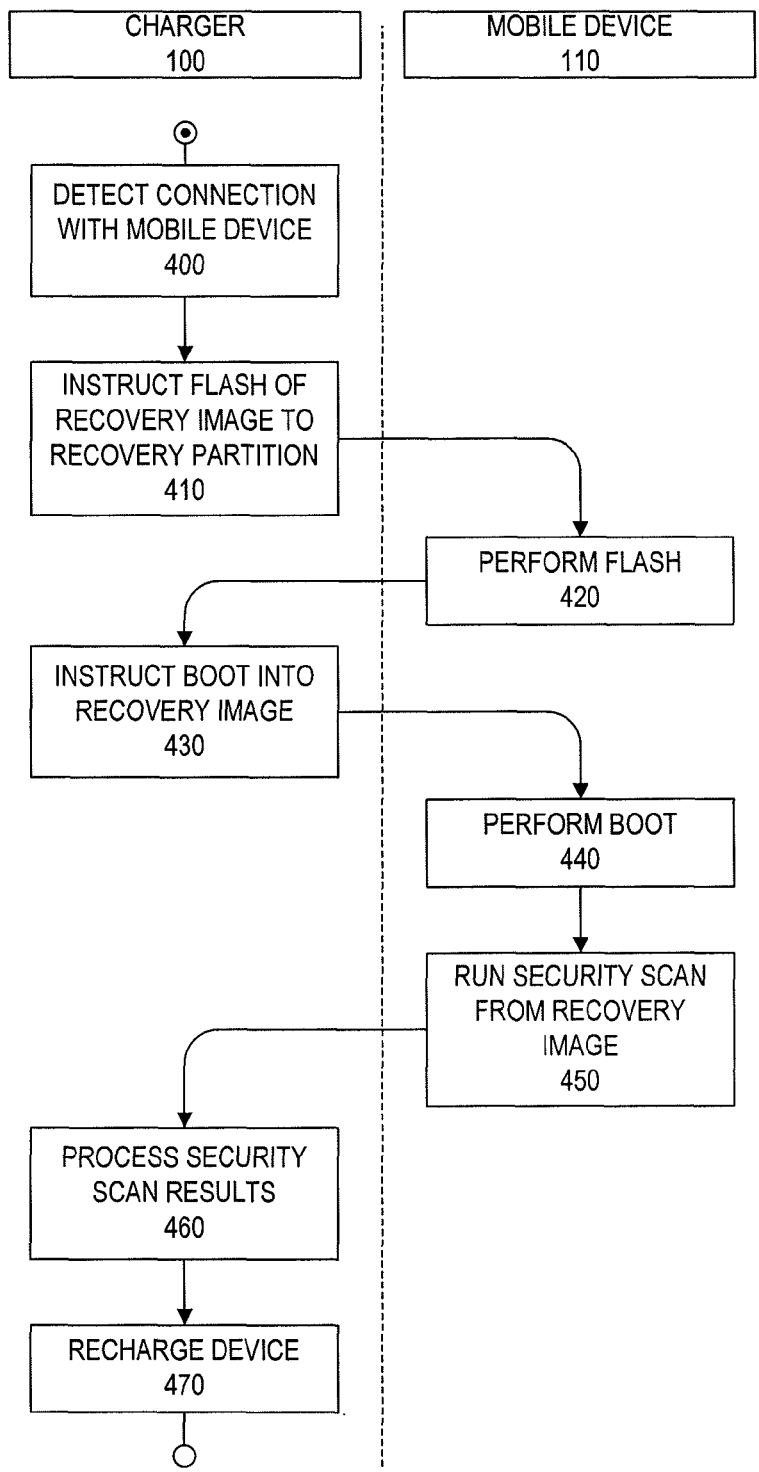
FIG. 4 illustrates an example of a hygienic charging operation in accordance with one embodiment.
Figure 5:
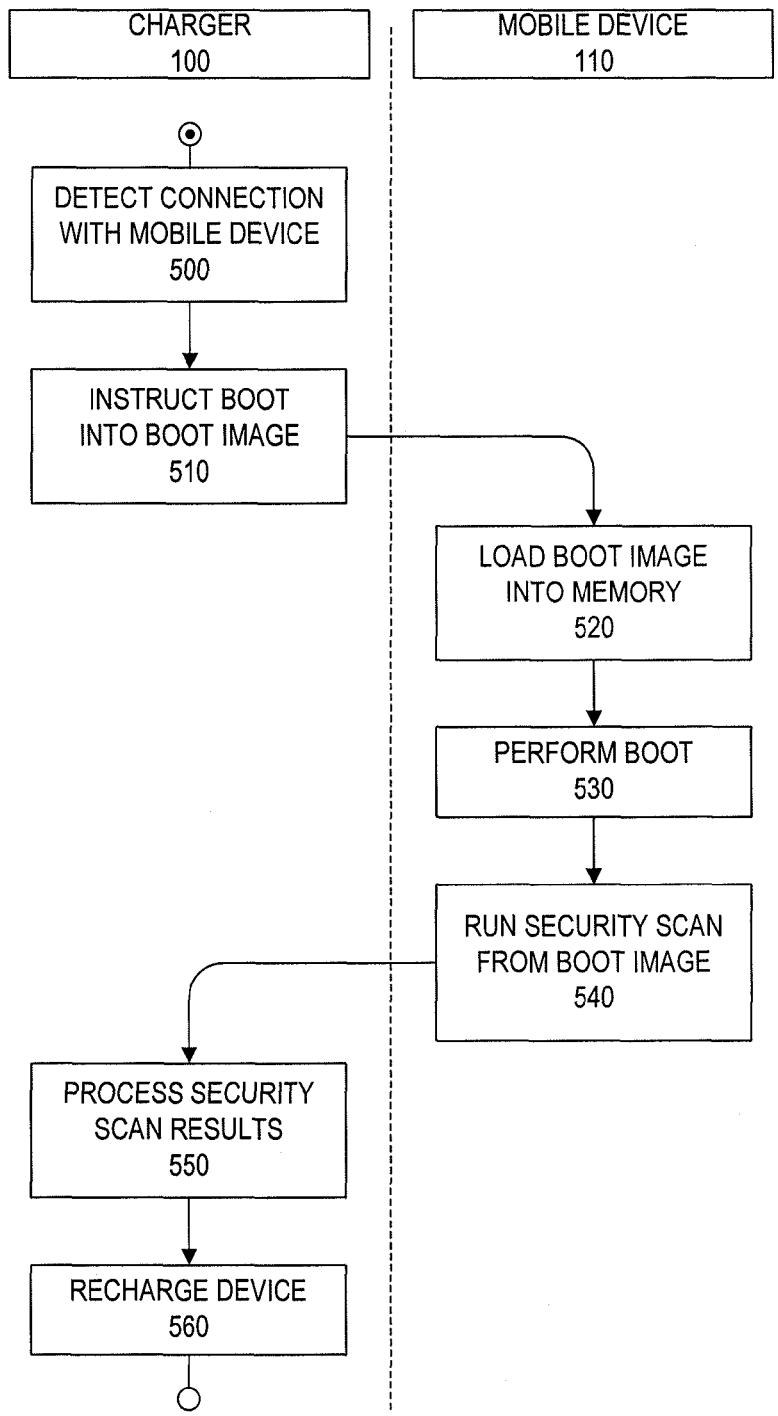
FIG. 5 illustrates an example of a hygienic charging operation in accordance with one embodiment.

FIGS. 4 and 5 illustrate ways in which charger 100 can analyze the security state of mobile device 110 comprising a NEXUS S ANDROID-based mobile phone. FIG. 4 illustrates an example of a hygienic charging operation in which charger 100 stores on mobile device 110 an image comprising instructions to analyze the security state of mobile device 110 and subsequently instructs mobile device 110 to boot into that image. FIG. 5 illustrates an example of a hygienic charging operation in which charger 100 instructs mobile device 110 to boot into the image having been loaded directly into memory of mobile device 110.

As illustrated in FIG. 4, upon detecting mobile device 110 being connected to/plugged into charger 100 (block 400), charger 100 can commence analysis of a security state of mobile device 100. Charger 100 can commence the security analysis automatically (i.e., without user input via an input interface of charger 100 or mobile device 110) or in response to user input (e.g., via an input interface of charger 100 or mobile device 110). In an embodiment in which charger 100 commences the security analysis automatically, user input is not solicited to commence the security analysis although user input m ay be solicited throughout the security analysis after it has commenced.

Once commenced, the security analysis can include charger 100 instructing mobile device 110 to flash a recovery image to a recovery partition (e.g., a NAND partition) of mobile device 110 (block 410). Although a recovery image and a recovery partition are disclosed in this embodiment, any suitable type of image can be flashed or stored to any suitable location in the non-volatile storage of mobile device 110 in accordance with the teachings of the present disclosure.

Flashing an image to a partition generally refers to the process of erasing the current contents of a partition (usually stored in updatable "flash" memory) and replacing it with the contents of the image (i.e., data) to be flashed. In order to accomplish this, charger 100 can first induce mobile device 110 to reboot in a bootloader mode.

Charger 100 can utilize Android Debug Bridge (ADB)—an in-built mechanism of the ANDROID device—or other suitable software on mobile device 110 to reboot into bootloader mode. If such software is not available on mobile device 110, charger 100 can instruct the user via the user interface (screen) of mobile device 110 to reboot into bootloader mode (e.g., by powering down then pressing the volume up button and power button simultaneously). It can be assumed that the bootloader is signed by the vendor.

Upon reboot into bootloader mode, the bootloader of mobile device 110 can implement a protocol such as fastboot to provide a communication pathway through which charger 100 can instruct the flashing of the recovery image to the recovery partition of mobile device 110.

The recovery image can comprise instructions (e.g., a custom Kernel and ramdisk image) to analyze the security state of mobile device 110 and thus implementing a mobile device side of any suitable security measure such as those described above. The recovery image can be stored in storage 320 of charger 100 (e.g., in a signed/encrypted format) or can be supplied in a known location on mobile device 100 (e.g., in a signed/encrypted format). If stored on mobile device 110, malware on mobile device 110 would not be able to change the recovery image because the private key can be stored in the enterprise, similar to the mechanism used to protect the bootloader. However, storing the recovery image on charger 100 provides the advantage of keeping the public key of the enterprise on charger 100 without mobile device 110 having access to it.

Thus, in response to charger 100 instructing mobile device 110 to flash the recovery image to a recovery partition of mobile device 110, mobile device 110 can implement the flash operation (block 420). Charger 100 can subsequently instruct mobile device 110 to automatically boot into the recovery image (block 430). In response, mobile device 110 can boot into the recovery image (block 440), causing mobile device 110 to execute the recovery image instructions (block 450) which can comprise any security measure contained therein. The recovery image can be a reasonable size (e.g., less than 4 MB) and can include a software self-checking mechanism (e.g., checksum, MD5 hash of memory contents, etc.) to verify that it has been properly booted.

The recovery image can act similar to a Live CD on a traditional laptop/desktop. For example, the custom recovery image can cause mobile device 110 to mount its file system and begin to look for indications of compromise (e.g., incorrect checksums of system libraries, kernel, kernel modules, native binaries, permissions). It should be noted that trust is placed on the bootloader and the underlying hardware of the device to not actively hide malicious activity; everything else can be treated as untrustworthy. It should also be noted that the operating environment of mobile device 110, once in recovery mode, does not use drivers or filesystem loaders of the possibly compromised mobile device, but of those that were built into the custom recovery image.

Once mobile device 110 has completed looking for indications of compromise, it can provide the results of its security scan to charger 100 for processing (block 460). Should charger 100 determine that the results indicate that mobile device 110 is compromised, charger 100 can take action to remedy the compromised state of mobile device 110, such as zeroizing mobile device 110 (e.g., overwriting its partitions to render it inoperable) thereby forcing the user to return mobile device 110 to the enterprise for re-provisioning. Alternatively, charger 100 can store a signed gold master recovery image that can be used to re-provision the device at the time of detection. This gold master recovery option can comprise wiping mobile device 110 of all data and reconstituting the user's data by downloading it from the enterprise via a network. The processing of the security scan results can be divided among charger 100 and mobile device 110 in any suitable manner, including a joint effort in which charger 100 and mobile device 110 process the data together via timing-based attestation for example.

Once the security measures have been cleared, using its cryptographic processor charger 100 can deposit a time-sensitive secure token that indicates mobile device 110 has passed the pre-defined checks. The tokens can form a basis on which the enterprise can allow mobile device 110 to access private networks and resources of the enterprise that would have otherwise been off-limits. Charger 100 can also digitally sign measurements associated with the security state of mobile device 110 (e.g., data such as offsets of libraries, heuristics, etc., compiled by mobile device 110 when looking for indications of compromise), and provide the signed measurements to the enterprise to form a basis on which the enterprise can decide to grant or deny access to mobile device 110 (e.g., via security protocols such as SASL and/or IKE). Upon completion of the security analysis, charger can continue to charge mobile device 110 (block 470).

The hygienic charging operation can be time efficient, taking a small amount of time such as less than three minutes in situation in which re-provisioning is not required. Charger 100 can also employ other policy decisions in implementing the hygienic charging operation, such as automatically re-provisioning if a set amount of time has lapsed since the last operation (e.g., one day).

Each mobile device can require a different set of measurements/analysis that must be done on charger 100. While a class of device (e.g., ANDROID devices) can be lumped together, each mobile device vendor can also have a different configuration that can require a customized capability on the charger. In such situations, charger 100 can therefore be tied to a particular individual's phone.

As illustrated in FIG. 5, rather than writing to non-volatile storage (e.g., the NAND partition) as depicted in the embodiment of FIG. 4, charger 100 can utilize a "direct boot" or "one shot" booting mechanism that loads the image directly into mobile device 110's memory (e.g., RAM) and transfers execution to it. Such a booting mechanism is supported by the fastboot protocol, for example, and allows for booting a boot image (the equivalent of the recovery image described above) without the inconvenience of erasing the existing recovery partition on non-volatile storage, thus allowing the normal use of that partition for other purposes if desired by the user. Utilizing a one shot boot can therefore be less intrusive on mobile device 110 than the flashing embodiment described above.

Blocks 500, 530, 540, 550 and 560 generally correlate to blocks 400, 440, 450, 460 and 470. The one shot embodiment of FIG. 5 differs from the flashing embodiment of FIG. 4 in that charger 100 can instruct mobile device 110 to boot a boot image (equivalent in functionality to the recovery image described above) directly into mobile device 110's memory (block 510). Upon receipt of this instruction, mobile device 110 can load the boot image (which can be stored on charger 100 or supplied in mobile device 100 as described above in connection with the recovery image) into its memory (block 520) and automatically boot into the boot image (block 530) thereafter.

It will be appreciated that the above description for clarity has described some embodiments of the disclosure with reference to single steps. However, it will be apparent that any suitable distribution of functionality among each step can be used without detracting from the disclosure. For example, functionality illustrated to be performed in a single step may be performed in multiple steps. Hence, references to specific steps may be seen as providing the described functionality rather than indicative of a strict logical or physical structure or organization.

The circuitry of charger 100 can be implemented in any suitable form, including hardware, software, firmware, or any combination of these. The circuitry can also be implemented partly as computer software running on one or more data processors and/or digital signal processors. The elements and components of the circuitry can be physically, functionally, and logically implemented in any suitable way. Indeed, the functionality can be implemented in a single unit, in a plurality of units, or as part of other functional units. As such, the circuitry can be implemented in a single unit or may be physically and functionally distributed between different units and processors.

The instructions described above can be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 320, that can contain or store programming for use by or in connection with an instruction execution system, apparatus, or device.

The instructions can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains m any specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus comprising:
a first interface configured to connect to a power source;
a second interface configured to connect to a mobile device; and
circuitry configured to
provide power from the power source to the mobile device, and
analyze a security state of the mobile device upon connection of the mobile device to the apparatus,
wherein the apparatus lacks a capability to establish a network connection between the apparatus and a node over a network.

2. The apparatus of claim 1, wherein the first interface comprises prongs protruding from a housing of the apparatus and configured to plug into the power source.

3. The apparatus of claim 1, wherein the second interface comprises a Universal Serial Bus (USB) port.

4. The apparatus of claim 1, wherein the circuitry comprises a special purpose operating system customized to analyze the security state of the mobile device.

5. The apparatus of claim 1, wherein the circuitry comprises a cryptographic processor.

6. The apparatus of claim 1, wherein the circuitry is configured to store on the mobile device an image comprising instructions to analyze the security state of the mobile device.

7. The apparatus of claim 1, wherein the circuitry is configured to load into memory of the mobile device an image comprising instructions to analyze the security state of the mobile device.

8. The apparatus of claim 1, wherein the circuitry is configured to instruct the mobile device to boot into an image comprising instructions to analyze the security state of the mobile device.

9. The apparatus of claim 1, wherein the circuitry is configured to digitally sign measurements associated with the security state of the mobile device.

10. The apparatus of claim 1, wherein the circuitry is configured to generate a cryptographic token associated with the security state of the mobile device.

11. The apparatus of claim 10, wherein the cryptographic token comprises a time-sensitive token indicating that the mobile device has passed a check of its security state.

12. The apparatus of claim 1, further comprising a storage in which an image comprising instructions to analyze the security state of the mobile device is stored.

13. The apparatus of claim 1, further comprising a storage in which a public cryptographic key of an enterprise server associated with the mobile device is stored.

14. The apparatus of claim 1, further comprising a storage in which a signed gold master recovery image that can be used to re-provision the mobile device is stored.

15. The apparatus of claim 1, wherein the apparatus lacks a capability to execute rich media formats.

16. The apparatus of claim 1, wherein the apparatus lacks a capability to be usable as a web browser.

17. The apparatus of claim 1, wherein the circuitry is configured to analyze the security state of the mobile device using timing-based attestation.

18. The apparatus of claim 1, wherein the circuitry is configured to provide instructions to the mobile device to initiate a network connection between the mobile device and a server over a network.

19. A method comprising:
providing, by a charger for a mobile device, power from a power source to a mobile device, and
analyzing, by the charger, a security state of the mobile device upon connection of the mobile device to the charger,
wherein the charger lacks a capability to establish a network connection between the charger and a node over a network.

20. The method of claim 19, wherein the charger comprises a cryptographic processor.

21. The method of claim 19, wherein the analyzing of the security state comprises storing on the mobile device an image comprising instructions to analyze the security state of the mobile device.

22. The method of claim 19, wherein the analyzing of the security state comprises loading into memory of the mobile device an image comprising instructions to analyze the security state of the mobile device.

23. The method of claim 19, wherein the analyzing of the security state comprises instructing the mobile device to boot into an image comprising instructions to analyze the security state of the mobile device.

24. The method of claim 19, wherein the analyzing of the security state comprises digitally signing measurements associated with the security state of the mobile device.

25. The method of claim 19, wherein the analyzing of the security state comprises generating a cryptographic token associated with the security state of the mobile device.

26. The method of claim 25, wherein the cryptographic token comprises a time-sensitive token indicating that the mobile device has passed a check of its security state.

27. The method of claim 19, wherein the analyzing of the security state comprises using timing-based attestation.

28. The method of claim 19, comprising using a signed gold master recovery image stored in the charger to re-provision the mobile device.

29. The method of claim 19, comprising providing, by the charger, instructions to the mobile device to initiate a network connection between the mobile device and a server over a network.

* * * * *